Dec. 3, 1968  P. NADELSON  3,413,908
APPARATUS FOR PRODUCING A COFFEE INFUSION
Filed March 1, 1965  6 Sheets-Sheet 1

FIG.1

INVENTOR.
PHILIP NADELSON
BY
ATTORNEY

Dec. 3, 1968 P. NADELSON 3,413,908
APPARATUS FOR PRODUCING A COFFEE INFUSION
Filed March 1, 1965 6 Sheets-Sheet 2

INVENTOR.
PHILIP NADELSON
BY
ATTORNEY

Dec. 3, 1968    P. NADELSON    3,413,908
APPARATUS FOR PRODUCING A COFFEE INFUSION
Filed March 1, 1965    6 Sheets-Sheet 3

FIG. 5

INVENTOR.
PHILIP NADELSON

ATTORNEY

FIG. 6

Dec. 3, 1968    P. NADELSON    3,413,908
APPARATUS FOR PRODUCING A COFFEE INFUSION
Filed March 1, 1965    6 Sheets-Sheet 5

FIG. 7

INVENTOR.
PHILIP NADELSON
BY
ATTORNEY

Dec. 3, 1968  P. NADELSON  3,413,908
APPARATUS FOR PRODUCING A COFFEE INFUSION
Filed March 1, 1965  6 Sheets-Sheet 6

INVENTOR.
PHILIP NADELSON
BY
ATTORNEY

United States Patent Office 3,413,908
Patented Dec. 3, 1968

3,413,908
APPARATUS FOR PRODUCING A
COFFEE INFUSION
Philip Nadelson, 28—16 34th St.,
Long Island City, N.Y. 11103
Continuation-in-part of application Ser. No. 119,402,
June 26, 1961. This application Mar. 1, 1965, Ser.
No. 436,233
12 Claims. (Cl. 99—297)

ABSTRACT OF THE DISCLOSURE

Apparatus for producing a beverage infusion comprising an urned portion, having, in turn, a liquid reservoir, a flared portion extending upwardly and outwardly from said liquid reservoir, a peripheral flange extending upwardly from said flared portion and a seat at the juncture between said flared portion and said peripheral flange; a pouring spout being located along said peripheral flange and above the seat defined by the juncture between the flange and the flared portion; the angle of inclination and length of said flared portion being chosen to provide a rapid by-pass between the container and the flared portion upon the upward stroke of said container; the area of the by-pass about the container at the location of said flared portion being sufficient to enable the liquid caused to flow upwardly by the container on its upward stroke to enter the by-pass and return to the liquid reservoir without entering the cover portion, enabling the cover portion to remain clean and free of liquid, in the reservoir; said liquid reservoir further comprising a cover portion disposed in an hermetically sealed relationship with respect to said urned portion, said cover portion being particularly adapted to be disposed in an hermetically sealed relationship with respect to said peripheral flange, and upon said seat; and a container particularly adapted to be reciprocated through at least one cycle relative to a liquid base disposed in said liquid reservoir; the dimensions of said container and said liquid reservoir being chosen to define a minimum by-pass therebetween; and wherein said container comprises a top portion; a bottom portion; and a center portion extending between said top and bottom portions; and wherein said top and bottom portions each comprise at least one mesh insert, the insert in said top portion being recessed, and the insert in said bottom portion protruding therefrom.

---

This application is a continuation-in-part of my co-pending application Ser. No. 119,402, filed June 26, 1961, and entitled Coffee Making Device.

The present invention pertains, generally, to apparatus for producing a beverage infusion, and, more particularly, to apparatus for delivering an infusion of coffee.

Coffee as a beverage is enjoyed because of the cooperation between the olfactory organs, and the gustatory nerves. The latter, which are responsible for the sense of taste, reacts or recognizes only ingredients that are sweet, sour, salty, and bitter. The coffee bean releases caffeine, which has a bitter taste. Caramelized sugar, which imparts some sweetness to the brew, and charred cellulose, both of which are released during the roasting process, are primarily responsible for the color of the infusion. Other ingredients are acidic in nature, imparting sourness to the infusion. It will therefore be realized that maximum pleasure from an infusion of coffee is derived from the bouquet of aromatic ingredients, held in solution or adsorbed on the surface of the infusion, to which the sense of smell or gustatory nerves responds. These pleasure producing ingredients are the water soluble oils, volatile oils, and certain fat contents contained in the coffee bean. Thus, as is considered readily apparent, it is necessary to skillfully capture and retain such ingredients in a water base, so that any resulting beverage infusion will possess the requisite properties, such as aroma and taste.

The fact that the coffee bean contains a maximum amount of the aforementioned aromatic-producing ingredients at the time of harvest, and that these ingredients are only released when the bean is roasted, since it is only at that time that they are molecularly altered to a sufficient extent as to be available in an infusion, is well established. However, as aging of a roasted bean occurs, these ingredients volatize, especially when exposed to the atmosphere. The essential oils and other desirable ingredients available for the resulting infusion or brew thus decreases with time, so that it can be said the use of an aged roasted bean produces a "stale" beverage. Any loss in these essential ingredients is accelerated if the bean is fractured, as by grinding. This is particularly true since the ground bean, having many times the surface area of the whole bean, will rapidly dissipate its oil content upon exposure to the atmosphere by evaporation and oxidation.

As hereinbefore pointed out, the pleasure derived from a coffee infusion is primarily the result of the response by the olfactory organs to the aromatic ingredients contained therein, the sense of smell and taste conjointly responding to flavor in the infusion. The most successful brew must therefore be one that contains a maximum amount of the available essential oils and other such pleasure producing ingredients. However, during the roasting process, the coffee bean sustains a loss of approximately 16% by weight, such loss bearing with it a substantial amount of the aromatic ingredients, that is, the volatile oils, water soluble oils, fats, and of the like, developed during that process. This is at least partially demonstrated by the odor emitted during a roasting process.

Accordingly, the brewing process, and the apparatus for performing this function must be such as to utilize the whole of a freshly roasted coffee bean. That is, the time during which the freshly roasted bean is exposed to oxidation and moisture contact should be reduced to a minimum. Moreover, during the actual brewing process, every effort should be made to retain those essential oils and other aromatic ingredients not lost during the roasting process, thus retaining as much of the available aroma and flavor as is possible. Accordingly, any fumes that result from the application of heat during the brewing process, which inherently acts as a carrier of the aromatic-producing volatile oils, should not be allowed to dissipate, but rather, are to be retained and infused into the brew. At the same time, and during the brewing process, ambient conditions should be excluded from their application upon the ground and freshly roasted bean to thus preclude any deleterious alteration of the bean's chemical structure during that step.

A further consideration with respect to the brewing process, and a most salient one, is to maintain the coffee bean in a roasted and ground state in intimate contact with a quantity or volume of water at a specified temperature. It has been found that optimum results are obtained by precluding such intimate contact between the water and coffee bean until the former reaches a predetermined temperature. However, until such temperature is reached, the criteria remains that the application of ambient conditions upon the coffee bean should be precluded. Accordingly, by disposing the coffee bean in an hermetically sealed enclosure when the water reaches the desired temperature, and maintaining this hermetic condition all during the infusing time, during which time a most intimate relationship between the bean and the water is developed, the volatized oils will be retained in a substantially ideal atmosphere during extraction, an atmosphere that precludes not only their escape, but any atmospheric alteration of the molecular structure of the bean.

It will now be understood that the capture, containing and the utilization of the aforementioned oils and other aromatic ingredients of the ground and freshly roasted coffee bean is a most critical desideratum in obtaining a most successful coffee infusion. During the actual brewing or infusion, beans are disposed within a container, and the ingredients extracted therefrom. In order to obtain optimum results in the extraction of the available essential ingredients, not only is it necessary to present and maintain an intimate relationship between the coffee bean and the liquid, but also requisite is the preclusion of any substantial by-pass of the liquid around and about the container that holds the coffee bean. A minimum by-passing of the liquid, therefore, will insure that the maximum essential aromatic gases, oils, and fats will be extracted. The hermetically sealed environment will thus insure the desirable retention, re-absorption and adhesion of the gases relative to the fluid extract.

It can be seen, therefore, that maintaining an intimate relationship between the coffee bean and a water base, which can be accomplished by reducing to a minimum the extent to which the water base is allowed to by-pass the container in which the coffee bean is disposed during the actual brewing or infusing step, is responsible for an extraction of the maximum available essential oils. This is relatively impossible to accomplish if the coffee bean is disposed in a stationary container, and the water base acted upon so as to cause it to rise towards the coffee bean. In the first instance, this requires boiling of the water base, necessitating a prevailing temperature in excess of 200 degrees Fahrenheit. Rather than a prevailing temperature in that range, it has been found that an ideal prevailing temperature for a coffee infusion during the actual brewing step is in the range of 190 degrees Fahrenheit. Moreover, boiling of the water base causes a turbulent action that reduces the uniformity of the contact between the coffee bean and the water base. Optimum results can, however, be achieved by reversing the infusing step, that is, by translating the container in which the bean is disposed first into the water base, and then outwardly thereof. In this manner, practically all of the water has passed through the coffee bean. When the container is then translated outwardly from the water base, the latter will again have passed through the coffee bean, at the same time enabing most of the infused or brewed coffee to drain off. There results, therefore, a complete wetting-through of the coffee bean, while yet precluding the floating of the bean on the surface of the water base.

An ideal coffee infusion can be rich and strong, but yet mellow. These characteristics will result from producing a coffee infusion having in mind each and every one of the foregoing criteria. With particular respect to the latter characteristic, namely, mellowness, and in addition to precuding the application of the atmosphere during the actual brewing step, other criteria are signficant, such as the speed of extraction, and the type of coffee grind. Thus, over-exposure, or for that matter under-exposure of the coffee bean in intimate relationship with the water base can result in a coffee brew that is less than ideal. Again, it is emphasized that this depends upon the type of grind. For example, a fine grind has the least aromatic element content, while a coarser grind contains more aromatic element, but also deteriorates at a slower rate. Accordingly, it is desirable that the number of times or cycles that the coffee bean is wet-through in the water base be capable of selection, it being understood that a cycle comprises a translation of the coffee bean into the water base and thence outwardly therefrom. In this manner, the type of coffee grind will be suited, at the same time insuring that the maximum desirable elements are permitted to be infused within the water base, short of allowing an infusion of undesirable elements of the coffee bean.

Having in mind each and every one of the foregoing considerations, it will be understood that a primary object of the present invention is to provide apparatus for producing a beverage infusion, such as, for example, an infusion of coffee, said apparatus being so devised, constructed and arranged as to skillfully capture and retain the bouquet of aromatic pleasure producing ingredients of a coffee bean, such as the water soluble oils, volatile oils, and certain fat contents, enabling the presentation of a beverage infusion that will present the maximum requisite characteristics of aroma and taste.

Another primary object of this invention, in addition to each and every one of the foregoing, is to provide apparatus for producing a beverage infusion, such as, for example, an infusion of coffee, said apparatus being so ample, constructed and arranged as to be capable of utilizing the whole of a freshly roasted coffee bean, enabling the time during which the bean is exposed to oxidation and moisture contact to be substantially reduced to a minimum.

Yet another primary object of the present invention, in addition to each and every one of the foregoing, is to provide apparatus for producing a beverage infusion, such as, for example, an infusion of coffee, said apparatus being so devised, constructed and arranged as to be capable of capturing, containing and utilizing the fumes that result from the application of heat during the brewing process, and act as a carrier of the aromatic-producing volatile oils, and infusing them into the brew.

Furthermore, it is a primary object of this invention to provide apparatus for producing a beverage infusion, such as, for example, an infusion of coffee, said apparatus being so devised, constructed and arranged as to exclude ambient conditions during the brewing process, and their application upon the ground and freshly roasted coffee bean, to preclude the application of oxygen and moisture, and a resulting alteration of the chemical structure of the bean.

Still further, it is a primary object of the present invention to provide apparatus for producing a beverage infusion, such as, for example, an infusion of coffee, said apparatus being so devised, constructed and arranged as to preclude intimate contact between a ground and freshly roasted coffee bean and a water base until the latter reaches a predetermined temperature by disposing the bean in an hermetically sealed atmosphere, and maintaining this atmospheric condition all during the infusion time, during which a most intimate relationship is developed and maintained between the coffee bean and a water base, enabling the escape of the carrier fumes to be precluded, further enabling the carrier fumes to be captured, contained, utilized and infused into the coffee brew, further enabling an atmospheric alteration of the molecular structure of the coffee bean to be precluded.

Additionally, a primary object of this invention is to provide apparatus for producing a beverage infusion, such as, for example, an infusion of coffee, said apparatus being so devised, constructed and arranged as to enable the extraction of the maximum available essential aromatic gases, oils and fats by precluding a substantial by-pass of the water base with respect to a container in which the coffee bean is disposed, further enabling a complete wetting-through of the coffee bean in the water base for each cycle of the container with respect thereto thus insuring that the maximum available essential aromatic-producing contents of the coffee bean are infused.

Another primary object of this invention is to provide apparatus for producing a beverage infusion, such as, for example, an infusion of coffee, said apparatus being so devised, constructed and arranged as to be capable of selecting, pre-determining or adjusting the number of cycles of a container within which the coffee bean is particularly adapted to be disposed with respect to a water base, enabling the length of time during which the coffee bean is disposed in an intimate relationship with respect to said water base to be controlled, further enabling the provision of a method and apparatus for producing an infusion of coffee from various coffee grinds, such as fine grinds, coarse grinds, and the like, still further enabling a rich, strong but mellow infusion to be obtained.

The invention resides in the combination, construction, arrangement and disposition of the various component parts and elements incorporated in apparatus for producing a bevarge infusion, such as an infusion of coffee, as constructed in accordance herewith. The present invention will better be understood, and objects and important features other than those specifically enumerated above, will become apparent when consideration is given to the following detailed description, which when taken in conjunction with the annexed drawings, describe, disclose, show and illustrate a preferred embodiment of the present invention, and what is presently considered to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

Figure 1:
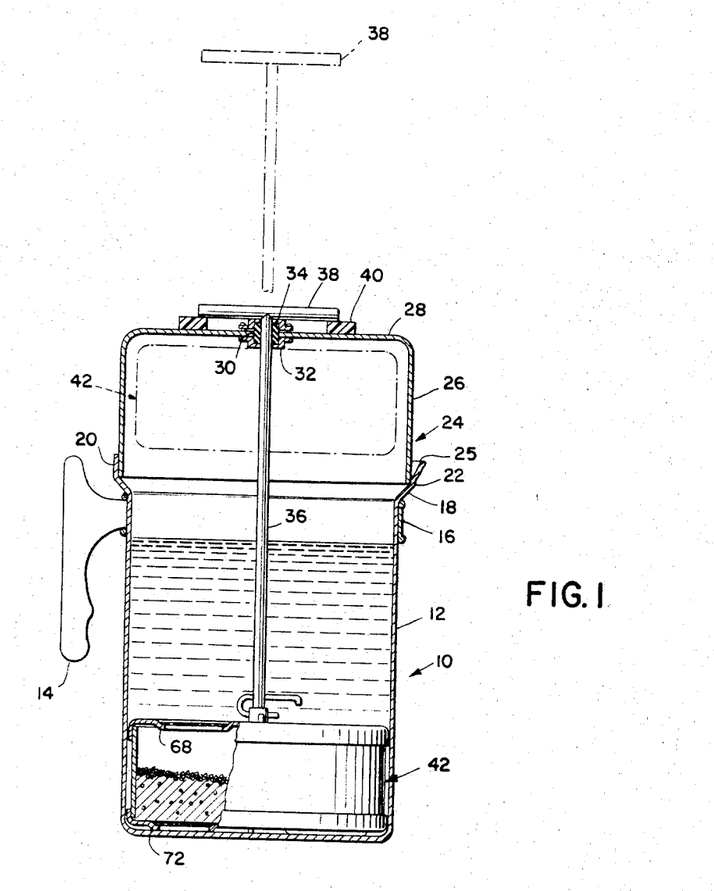
FIG. 1 is a cross-sectional view, partially in elevation, of an urn constructed in accordance with the principles of the present invention, illustrating the same as being applied to a manual method for producing a beverage infusion.

With reference now to the drawings, and particularly to FIG. 1, there is illustrated therein an urn constructed in accordance with the principles of the present invention, and generally designated by the reference character 10. At the outset, it will be understood that the urn 10 is particularly adapted for use in the home, in which case it will be capable of manual operation, as will hereinafter be described, as well as being particularly adapted for industrial or commercial use, in which instance the urn will be operatively associated with an automatic working head, also hereinafter to be described. It will in addition be understood, at this point, that the urn itself in conjunction with certain other component parts that enable it to be operated manually comprise an apparatus for producing a beverage infusion. An apparatus for producing a beverage infusion is also presented when the urn is used in conjunction with the working head, hereinafter to be described, in which case, when the apparatus is used commercially or industrially, the beverage infusion is automatically produced.

The urn 10 comprises a generally cylindrically configured lower liquid reservoir 12 that can be fabricated of any suitable material, and preferably is fabricated of a non-corrosive material, such as metal, glass, and the like. The lower liquid reservoir comprises a handle 14 that may be of any suitable construction, and is particularly adapted to be mounted upon the reservoir in any suitable manner, as through the medium of a band 16.

The reservoir 12 further comprises a radially outwardly flared portion 18 extending generally upwardly and outwardly from the location at which the handle 14 is illustrated as being positioned upon the cylindrical portion of the urn, though it will be understood that the handle can be positioned at any location along its height. The angle of inclination of the flared portion 18 is of particular importance, as will more fully be described hereinafter. Another cylindrical portion 20 extends upwardly from the flared portion 18. The junction between the flared portion 18 and the cylindrical portion 20 is so constructed and configured as to present an annular shelf or seat 22 upon which a cover 24 is particularly adapted to rest or be seated. The cylindrical portion 20 itself comprises a spout or pouring lip 25 that may be positioned at any location along its annulus, though preferably it is disposed in opposite relationship with respect to the handle 14, for reasons that are considered readily apparent. The location or position of the spout 25 is important in that it is disposed above the flared portion 18 and the seat 22. This is true since the dimensions of the cover 24 and the cylindrical portion 20 are chosen so that a tight fit therebetween is presented, thus enabling the provision of an hermetic seal at the location of the seat 22. Thus, during the actual brewing process, the hermetic seal between the cover 24 and the seat 22 precludes any undesirable escape of the aromatic-producing elements that are released from the coffee bean as a result of the application of heat thereto. In addition, the infusion cannot be poured from the urn 10, through the medium of the spout 25, until the process is completed, and the cover 24 removed therefrom.

As hereinbefore pointed out, the urn 10 is particularly adapted for both home use, and industrial or commercial use. Accordingly, and with continued reference now to the former instance, the cover 24 comprises an annular or generally cylindrically configured side portion 26 and a roof or ceiling portion 28. An aperture 30 extends centrally through the portion 28, within which there is fixedly positioned a bushing 32. The bushing may be of any suitable construction enabling it to be adjusted. That is, the bushing 32 preferably is of the type that enables the compressive force applied to a flexible gasket 34 to be increased or decreased. In this manner, it now being pointed out that the gasket preferably is fabricated of a material enabling it to function of cleaning a rod 36 that is particularly adapted to be reciprocally movable with respect thereto, the hermetic relationship between the cover portion 24 and the portion 20 of the urn 10 will not be disturbed. The rod 36, outwardly of the urn 10, comprises a handle 38 for purposes that are considered readily apparent. The roof or ceiling portion 28 of the cover 24 further comprises an annular rest or seat 40 fabricated of plastic, for example, enabling an operator to hold the cover portion in position against the upward force of the rod and container as registered by the liquid in the liquid reservoir 12.

It will now be understood that the cylindrical portion 20, which now may be defined as a vertically extending peripherally flanged lip, having a spout 25, can be said to define, or form, an open end of the liquid reservoir 12. This flanged lip extends upwardly from one end of the flared portion 18, the other and lower end thereof being particularly adapted to serve as a line guide for the level of the liquid adapted to be disposed within the reservoir. While the urn 10 is illustrated as comprising a spout 25 for pouring purposes, it will be understood that the urn may in addition, or in the alternative, comprise a faucet (not shown) disposed at the lower region of the reservoir.

Again it is emphasized that the angle of inclination and the height or length of the flared portion 18 is of primary significance, as is the locational position of the seat 22 and the spout 25, and the dimensions of the peripheral flange 20 with respect to the dimensions of the cover portion 24. And, with respect to the latter, it is again emphasized that the relationship between the cover portion and the peripheral flange is such as to present an hermetic seal therebetween, so that the fit between these elements may now be defined as a telescoping friction fit. As a result, during the brewing process or infusing step, the spout 25 is effectively sealed.

Figure 2:
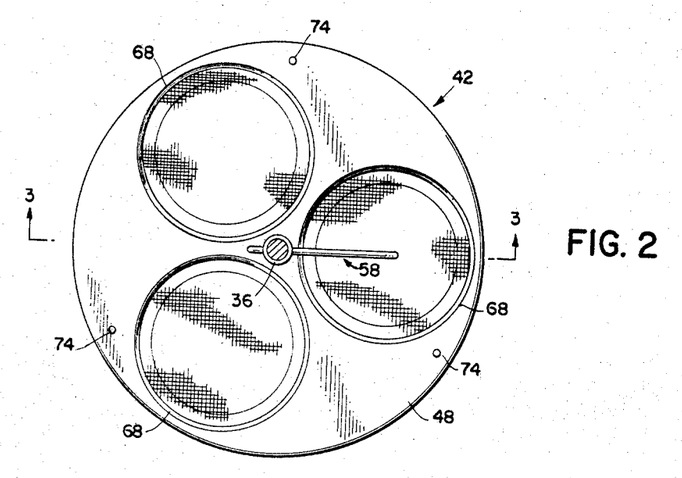
FIG. 2 is a plan view of a container particularly adapted to be operatively disposed within the urn of FIG. 1 within which a coffee bean is particularly adapted to be disposed.
Figure 3:
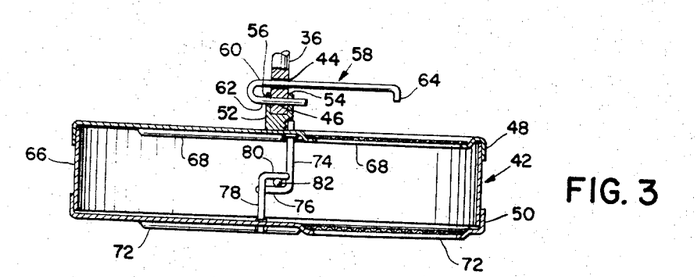
FIG. 3 is a cross-sectional view taken along the line 3—3 of FIG. 2.
Figure 4:
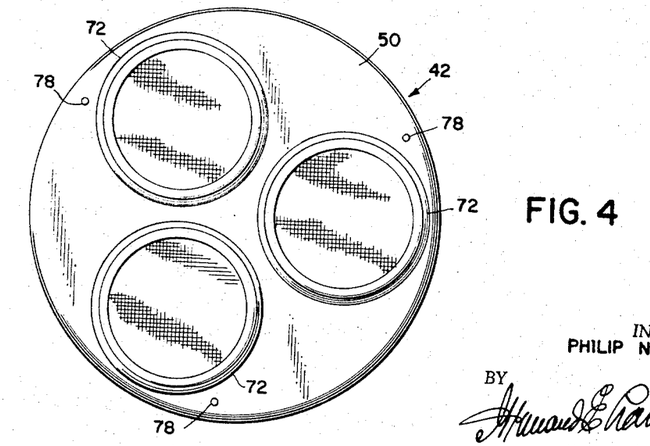
FIG. 4 is a bottom elevational view of the container illustrated in FIGS. 2 and 3.

With particular reference now to FIGS. 2 through 4, there is illustrated therein a container generally designated by the reference character 42 within which there is particularly adapted to be disposed a quantity of coffee bean for producing the beverage infusion. The container or enclosure 42 is particularly adapted to be removably operatively associated with the rod or carrier rod 36, and to that end, the latter comprises a plurality of apertures 44 and 46. In the illustrated and exemplary form of the container 42, the same comprises a top and bottom portion 48 and 50, respectively, the former of which comprises, in turn, a mounting block 52 extending upwardly therefrom. The block 52 comprises a vertically disposed bore 54 within which the lower end of the carrier rod 36 is particularly adapted to be disposed. Additionally, a horizontally disposed bore 56 extends through the block 52, and is particularly adapted to be disposed in alignment with the aperture 46 extending through the rod 36. A captive slide pin 58 of generally U-shaped configuration, and comprising a longer leg 60 and a shorter leg 62 is particularly adapted to perform the function of enabling the container 42 to be removably operatively associated with the rod 36. To this end, the longer leg 60 of the pin 58 is particularly adapted to extend through the aperture 44 of the rod 36, the leg comprising a finger 64 at one end thereof to preclude misplacing or losing the pin 58. The leg 60 is slidable within the aperture 44, so that when the lower end of the rod 36 is positioned within the bore 54 of the block 52, the pin may be moved to the left, as viewed in the drawing, and the leg 62 disposed within and extending through the aligned aperture 46 and bore 56. The ease and facility with which the container 42 can be operatively associated and disassociated with and from the rod 36 is now considered readily apparent.

In addition to the top and bottom portions 48 and 50, the container 42 further comprises a center ring of annular or cylindrical configuration that is particularly adapted to extend between the top and bottom portions 48 and 50. The top portion 48 comprises a plurality of recessed apertures 68 within each of which there is fixedly disposed a mesh insert 70 that may be fabricated of any suitable material, such as wire, cloth and the like. Similarly, the bottom portion 50 comprises a plurality of protruding or projecting apertures 72, within each of which a mesh insert 70 is particularly adapted to be fixedly disposed. In the illustrated and exemplary form of the container 42, the top portion 48 comprises 3 of the apertures 68, with the bottom portion 50 comprising a similar number. It will, however, be understood that the number of apertures can be varied. The significant criteria with respect to the apertures is that the apertures in the top portion be recessed inwardly towards the container 42, and the apertures in the bottom portion 50 protrude or project outwardly therefrom, to direct the liquid base into the container on its upward stroke, and to preclude any of the liquid base from being trapped therewithin.

The top portion 48 comprises further a plurality of fingers of generally L-shaped configuration, each of which comprises a horizontally extending shorter leg 76. The bottom portion 50 comprises a plurality of fingers 78 similar to the fingers 74, the fingers 78 also comprising a horizontally extending shorter leg 80. The longitudinal dimensional extent or length of each of the fingers 74 and 78 is such as to dispose the legs 80 above the legs 76. The fingers 74 and 78 are rotatable, for a purpose hereinafter to be described.

The center ring or center portion 66 of the container 42 comprises a plurality of prongs 82, the number of which correspond with the number of fingers 74 or 78. The prongs are fixedly positioned with respect to the center portion, and extend in a direction generally centrally thereof. The position of the prongs with respect to the legs 76 of the fingers 74, and the legs 80 of the fingers 78 is such as to dispose the prongs between the legs when the latter are disposed in parallel with respect to one another, as particularly illustrated in FIG. 3. It will now be understood that the container 42 comprises a plurality of separate portions 48, 50 and 66 which are particularly adapted to be removably operatively associated with respect to one another. To this end, the fingers 74 and 78 are first rotated to a position enabling the prongs 82 to be disposed at a location below that of the legs 80, and above that of the legs 76. The fingers 74 and 78 can then be rotatably translated to a position in which the legs are disposed in parallel with respect to one another, and the prongs extend therebetween. Though not shown, stops or abutments can be positioned upon the top and bottom portions 48 and 50 to define the limit of rotatable translation of the fingers 74 and 78. To insure that the fingers 74 and 78 will remain in the position illustrated in FIG. 3 once the prongs 82 are disposed between the legs 76 and 80, a suitable detent or other locking mechanism (also not shown) can be provided.

With continued reference again to FIG 1, it will now be understood that the diametral dimensional extent or diameter of the container 42 is chosen so that, when the container is disposed or positioned within the reservoir 12 for reciprocal movements therewithin, only a minimal by-pass for liquid between the container and the wall of the reservoir will be presented. Thus, during the actual infusion or brewing process, the container will be reciprocated within the liquid reservoir 12, and between a position in which the container is disposed within the cover portion 24, and a position in which it bottoms-out in the reservoir, with the handle 38 in the latter position coming to rest upon the rest or abutment 40. The number of reciprocations of the container within the liquid contained in the reservoir 12 will determine the strength of the infusion or the brew. This can be determined after a number of trial and error tests, and for example the results of such tests may be marked in a suitable legend along the wall of the reservoir 12 to facilitate the use and operation of the urn 10, and a determination as to how many reciprocating movements of the container 42 will be required for an infusion or brew that presents the desired strength for a particular grind or coffee bean.

As hereinbefore pointed out, the lower end of the flared portion 18 can be used as an indicator in determining the level to which a liquid base, such as water, is to be filled. At this point, the primary significance of the flared portion, its angle of inclination and its height will be understood, in that, these dimensions or values are chosen to enable the liquid base contained in the reservoir 12 to rise only to just short of the upper end of the flared portion, at the seat or juncture 22, without entering into the cover portion 24. That is, if the liquid base in the reservoir 12 is filled to the lower end of the flared portion 18, a downward reciprocating movement of the container 42 until it bottoms-out will cause the liquid base to rise, but, because of the chosen value of the angle of inclination and the height of the flared portion 18, the level of the liquid base will rise no further than just short of the upper end of that portion. Accordingly, throughout the infusion or brewing process, the cover portion 24 will remain clean. Any tendency for the liquid brew to be dispensed from the spout 25, or to overflow the peripheral flange 20, will be precluded in view of the hermetic relationship between the flange and the cover portion 24.

As hereinbefore pointed out, it is desirable that the coffee bean contained in the container 24 be completely wet-through each time it is reciprocated into the liquid base contained in the reservoir, and thence reciprocated outwardly thereof and into the cover portion 24. That is, for each complete cycle of the container 42, the quantity of coffee bean disposed therewithin will be completely wet-through twice. This, however, depends upon the degree of by-pass between the container and the wall of the reservoir. As pointed out above, the diametral dimensions of the container 42 and the reservoir 12 are chosen so that only a minimal by-pass will be presented, thus enabling sufficient freedom of movement therebetween, but precluding any significant or substantial amount of by-pass of the liquid brew or liquid base as the container is reciprocated therewithin. Thus, rather than being able to flow along the container, the liquid in the reservoir will be substantially completely forced through the container, thus causing a complete wetting-through of the coffee beans contained therewithin on the downward stroke thereof. The same is true when the container is reciprocated outwardly of the liquid in the reservoir.

The flared portion 18 serves another significant purpose as well. Thus, a complete cycle of the container 42 with respect to the liquid contained in the reservoir 12 comprises a downward linear movement until the container bottoms-out in the reservoir, and an upward linear movement. With respect to this latter movement, it is desirable that the container be completely lifted out of the liquid contained in the reservoir, and lifted into the cover portion 24 until it can be lifted no further. It is important that the container be lifted completely out of the liquid in the reservoir, since lifting it as far as it will go gives the liquid that has entered the container through the mesh inserts 70 a chance to "drain-off" from the coffee beans contained therewithin. Thus, the depth of the cover portion 24 is chosen so that a sufficient distance for lifting the container to such an extent as to present the desired "drain-off" time will be presented. The level of liquid in the reservoir will thus be substantially even with that of the liquid level line at the lower end of the flared portion at the beginning of each cycle of wetting-through of the coffee bean, that is, as the container is again reciprocated in a direction to cause it to enter the liquid. It is considered readily apparent, therefore, that a uniform beverage infusion or brew will be produced. The "drain-off" time is of course a function of the speed of movement of the container as each cycle is initiated and concluded. In the manual operation of the apparatus for producing a beverage infusion, the speed may well vary since in a manual operation it is hardly capable of accurate regulation. However, when automatically operated, as will hereinafter be described, the speed of each cycle of wetting-through of the coffee beans disposed within the container can be regulated, so that, when taken in conjunction with the depth of the cover portion, the height of the flared portion 18, and the other dimensional relationships hereinbefore alluded to, the actual infusing or brewing process will be substantially completely uniform in generally every respect. With respect to the flared portion 18, it will now be understood that an additional function or purpose to be served thereby is to guide, lead or center the container with respect to the liquid reservoir 12 as the downward stroke portion of each wetting-through cycle is initiated. And, while the degree of by-pass between the liquid reservoir 12 and the container 42 is maintained at a minimum, a substantial by-pass between the reservoir and the container is presented at the location of the flared portion 18. A rapid increase in the area between the liquid reservoir and the container is provided at this location, so that more than sufficient area will be presented for the by-pass of liquid that is caused to flow around the container upon the upward stroke portion of a wetting-through cycle thereof. In this manner, any by-pass of liquid around the container will be limited to the area of the flared portion 18, thus further insuring that the cover portion 24 will be maintained in a clean condition during the infusion or brewing process.

It will now be understood that an apparatus for producing a beverage infusion constructed in accordance with the principles of the present invention is particularly adapted for home use, and comprises an urn or urn portion 10, a cover portion 24, and a container 42 that is operatively associated with a carrier rod 36 having a handle 38 enabling the apparatus to be manually operated. As hereinbefore pointed out, an apparatus for producing a beverage infusion constructed in accordance with the principles of this invention is equally as well adapted to commercial or industrial use, in which the beverage infusion is automatically produced. With particular reference now to FIGS. 5 through 9, and wherein like reference characters indicate like parts, but wherein such like reference characters are primed, there is illustrated therein a working head assembly generally designated by the reference character 90.

Figure 5:
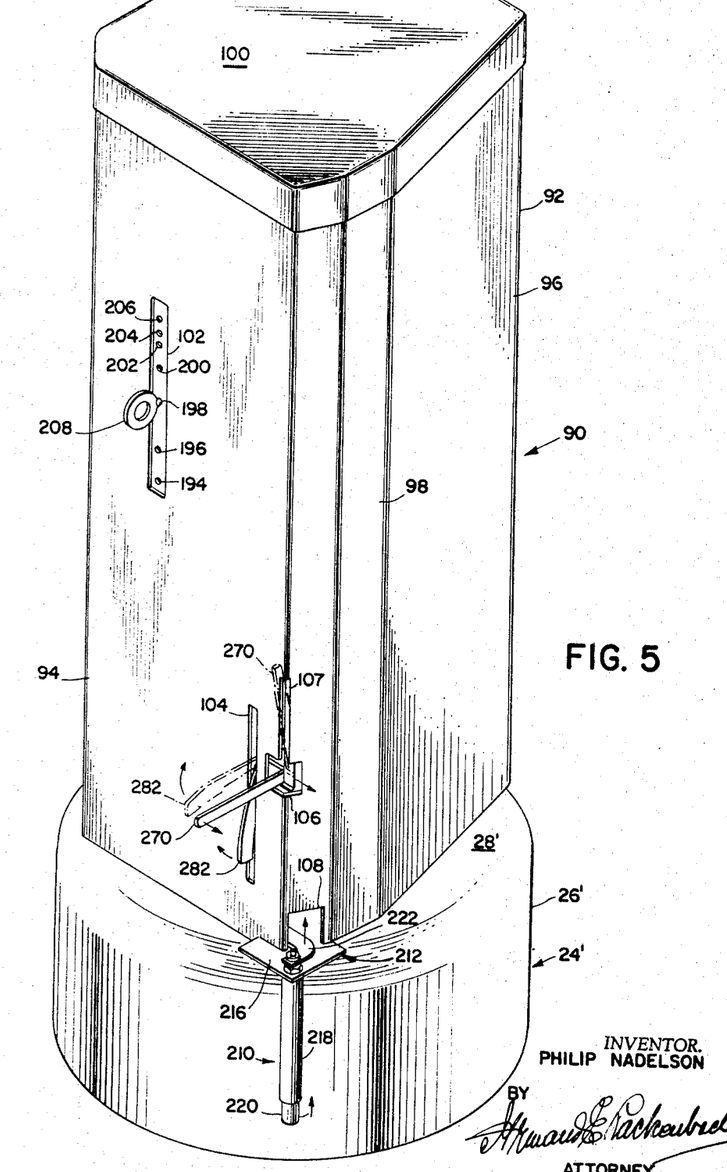
FIG. 5 is an isometric view of a working head constructed in accordance with the principles of the present invention.

The working head assembly 90 comprises a cover portion 24' that is substantially identical in construction with the cover portion 24 hereinbefore described, disclosed, shown and illustrated. Once again, the cover portion 24' is particularly adapted to be disposed in operative association with the urn portion 10, and more particularly, in an hermetically sealed relationship with respect to the peripheral flange 20 thereof. A housing 92 is removably positioned upon the roof portion 28' of the cover portion 24', and comprises a front cover portion 94 and a rear cover portion 96. The front cover portion 94 comprises end flanges 98 that are particularly adapted to be disposed in overlapping relationship with respect to similar flanges (not shown) of the rear cover portion 96. These flanges are then particularly adapted to be fixedly connected with one another in any suitable manner, as by means of suitable fasteners (not shown) such as screws, and the like. A top cover portion 100 of a configuration similar to that defined by the front and rear cover portions 94 and 96 when disposed in the illustrated relationship with respect to one another is particularly adapted to be removably positioned thereupon, to assist in maintaining the cover portions 94 and 96 in their illustrated relationship, and to close the upper end of the housing 90.

The front cover portion 94 comprises a selector pin slot 102, an operating lever slot 104, a service lever slot 106, and an operating plunger slot 108, the function and purpose of each of which will hereinafter be more fully described.

Figure 7:
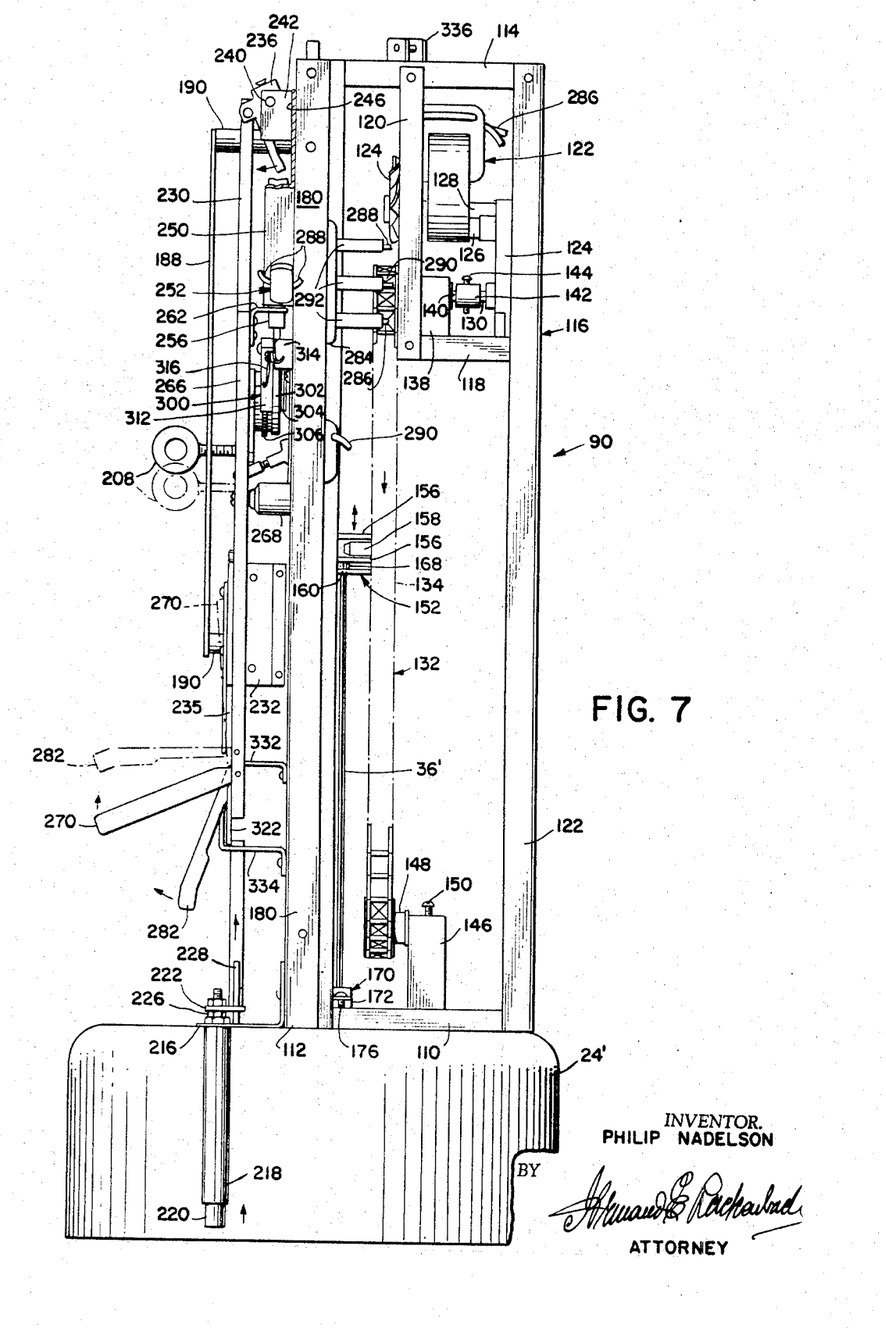
FIG. 7 is a side elevational view of the working head shown in FIG. 5, with the same parts having been removed to again clearly illustrate the interior details of construction thereof.
Figure 8:
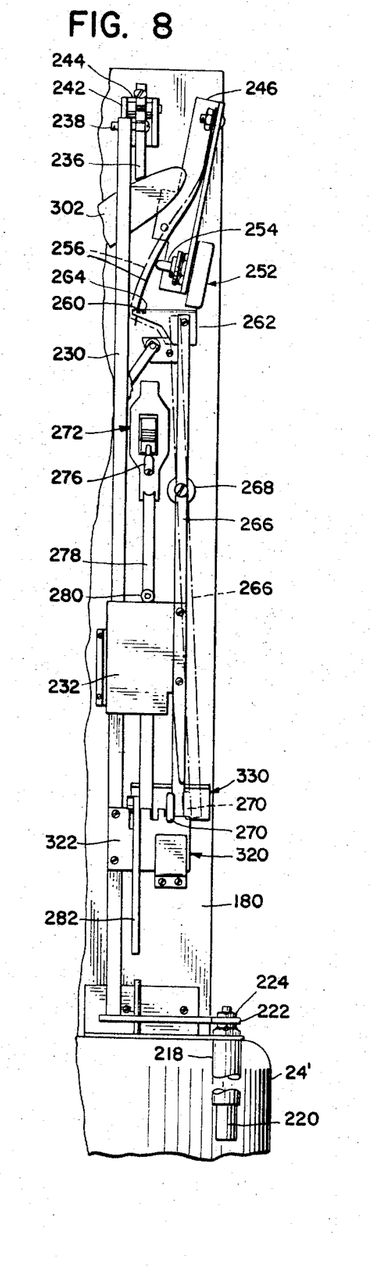
FIG. 8 is a partial front elevational view of the working head as illustrated in FIG. 6, illustrating in greater detail the positional and operating relationship between certain interior details of construction.
Figure 9:
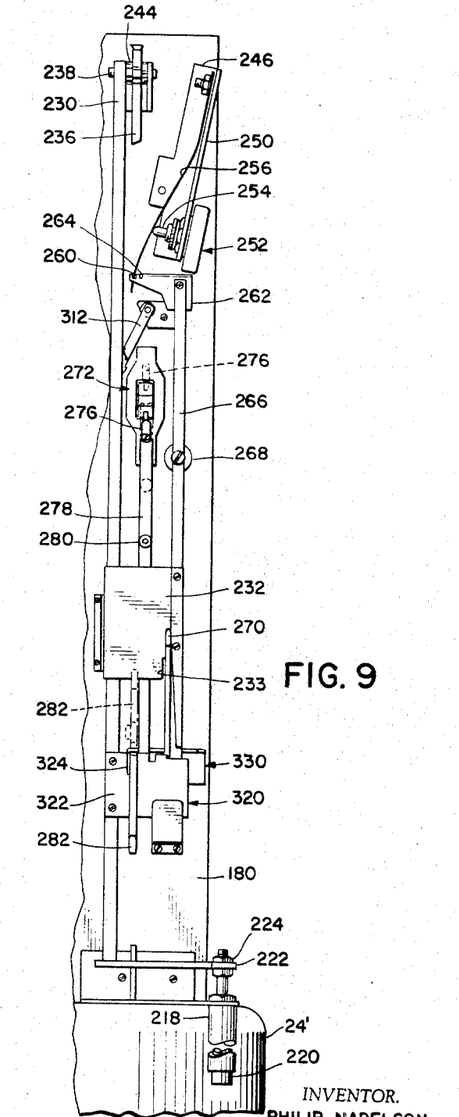
FIG. 9 is a partial side elevational view, again showing in greater detail the positional and operating relationship between certain interior details of construction.

With particular reference now to FIG. 7, a side elevation of the working head apparatus 90 is illustrated therein with the cover 92 having been removed. A base mounting block 110 is fixedly positioned upon the roof portion 28' of the cover portion 24'. The block 110 is generally of rectangular or square configuration, and at each corner there is fixedly connected thereto, in any suitable manner, a plurality of vertical standards 112 extending upwardly therefrom. A cover block 114 is positioned at the upper end of the standards 112 to thus define an inner open housing, generally designated by the reference character 116. A motor housing base mounting block 118 is fixedly connected to and between two of the standards 116, to which there is fixedly connected, in turn, a plurality of motor housing standards 120 that extend upwardly therefrom. The standards 120, at the upper end thereof, are fixedly connected to the inner housing cover block or cover plate 114. A motor 122 is particularly adapted to be fixedly positioned within the motor housing defined by the blocks or plates 118 and 114, the standards 120 and a portion of the standards 112. The motor may be of any suitable construction, and for example will comprise a fan 124 for purposes that are considered readily apparent. The motor 122 is particularly adapted to be fixedly positioned upon a transmission or reduction gearing assembly 124. This may be accomplished in any suitable manner, as for example through the medium of mounting elements 126. The motor 122 comprises an output shaft 128 that is particularly adapted to be operatively associated with the assembly 124 in a conventional manner. The assembly 124 comprises an output shaft 130, the rotational velocity of which will have been suitably reduced from that of the output shaft 128 of the motor 122 through the medium of the transmission or reduction gearing assembly 124, in a manner that is considered readily apparent to those skilled in the art.

The motor 122, through the medium of the assembly 124, is particularly adapted to cause the operation of a container driving assembly generally designated by the reference character 132. The container driving assembly comprises an endless driving chain or belt 134. The belt 134 extends between and about a plurality of driving sprockets 136, one of which is clearly illustrated in FIG. 6. The driving sprocket at the upper end of the belt 134 is particularly adapted to be driven by the output shaft 130, and to this end, there is positioned upon the mounting plate or block 118 a shaft mounting block 138. A sprocket driving shaft 140 is rotatably journaled within the block 138 and is rotatably operatively associated with the sprocket 136 at the upper end of the belt 134 in any suitable manner. The shaft 140 is particularly adapted to be non-rotatably operatively associated with the shaft 130, and to that end, a coupling 142 is operatively associated therewith and extends therebetween. A fastening element 144 is keyed with respect to the coupling 142, to facilitate the assembly and disassembly of the shafts 140 and 130. Another shaft mounting block 146 is fixedly positioned or mounted upon the mounting plate or block 110, from which an output shaft 148 extends, upon which the driving sprocket 136 at the lower end of the belt 134 is particularly adapted to be mounted. The shaft 148 is particularly adapted to be removably operatively associated with the block 146, and to this end, there is provided a fastening element 150. While the sprockets 136 have hereinbefore been referred to as driving sprockets, it will now be understood that it is the sprocket 136 at the upper end of the belt 134 that is a driving sprocket that sprocket being driven by the shaft 140, while the sprocket at the lower end of the belt 134 is a driven sprocket. The rotational translation of this driven sprocket is caused by the translation of the belt 134, as is now considered readily apparent.

It will now be understood that the motor 122 and the gear reduction assembly 124 together with its component part, such as the fan 123, and the output shaft 130, comprise an operating assembly for the container driving assembly 132. It is particularly within the scope of the present invention that this operating assembly be removable from its housing, as defined hereinabove, substantially as a unit, with a view towards being able to clean, repair, and otherwise service this operating assembly with maximum facility. To this end, and though not shown, the gear reduction assembly 124 can be fixedly positioned upon a plate in any suitable manner, the plate, in turn, being removably connected to the plates or blocks 114 and 118. As a result, by simply disassociating the shafts 130 and 140, which can be accomplished with facility by first removing the fastening element 144 that enables the coupling 142 to key the shafts 130 and 140 with respect to one another, and then disassociating this plate from the blocks 114 and 118, the plate (not shown) can be removed from the motor housing along with the motor and the gear reduction assembly.

As hereinbefore pointed out, the container driving assembly 132 is particularly adapted to cause the operation of a container, and more particularly, to cause the operation of the container 42 with respect to the urn portion 10 of the automatic apparatus for producing a beverage infusion. In speaking of the operation of the container 42, it will be remembered that such operation reciprocating movements of the container between a position in which it has been lifted out of the liquid reservoir 12, and is disposed completely within the cover portion 24', and a position in which the container has been reciprocated into the liquid reservoir, and is bottomed-out therewithin. Beginning with the position illustrated in phantom in FIG. 1, and terminating with that position after the container has been reciprocated to its bottomed-out position, and thence to the position illustrated in phantom, it will be understood that two such reciprocating movements of the container comprise a complete cycle of operation thereof. And, it will further be understood that such a complete cycle of reciprocating movement of the container is defined as a complete cycle of wetting-through of the coffee beans contained within the container. Accordingly, the container driving assembly 132 comprises, still further, a follower assembly 152 that is particularly adapted to be vertically reciprocated upon and with respect to a vertically disposed follower assembly guide rod 154. The follower assembly 152 comprises a plurality of plates 156 between which a follower 158 is particularly adapted to extend. The follower 158 is operatively connected with one of the links of the belt 132 in any suitable manner, and extends therefrom into the aforesaid position between the plates 156 to drive the follower assembly 152. A third plate 160 is disposed below the plates 156 to thus provide a space between it and a lower one of the plates 156, enabling the carrier rod 36' to be operatively connected with the follower assembly, in a manner hereinafter to be described. The follower assembly comprises, still further, a follower sleeve 162 fixedly connected to the assembly in any suitable manner, which sleeve is particularly adapted to be reciprocally movably mounted upon and with respect to the guide rod 154. A cam driving block 164 is fixedly positioned between the plates 156, and comprises a cam driving lug 166 extending outwardly therefrom, the function of which will hereinafter be described. The block 164 serves the function of a spacer in that it extends between the plates 156. Any play between the follower 158 and the plates 156 is therefore reduced to and maintained at a minimum. The plates 156 and 158 are particularly adapted to be disposed in fixed spaced parallel relationship with respect to one another, with the space between the plates 156 being defined in the manner just described. The space between the lower plate 156 and the plate 158 may be maintained at a fixed value in any suitable manner, as by means of a spacing nut (not shown).

The carrier rod 36', as pointed out hereinbefore, is particularly adapted to be removably operatively associated with the follower assembly 152. To this end, the plate 160 has an aperture through which the carrier rod is particularly adapted to extend. Similarly, the upper end of the rod 36' comprises an aperture, so that, when the upper end of the rod extends into the space between the lower plate 156, and the plate 160, a fastener element 168, such as a screw, can be inserted through the aperture to preclude the accidental disassembly of the carrier rod 36' with respect to the follower assembly during the infusion or brewing process. A bushing 170 is adjustably positioned upon the block or plate 110, and comprises an aperture extending therethrough through which the carrier rod 36' is particularly adapted to extend, and then enters the cover portion 24'. The bushing 170 comprises a bracket 172 of generally U-shaped configuration, and a gasket 174 of tubular configuration. The gasket may be fabricated of any suitable material, as for example Teflon, and the like. As pointed out, the bushing 170 is adjustable in that it is particularly adapted to perform the function of compressing the gasket 174 so that a desired frictional but yet slidable relationship will be presented between the gasket and the carrier rod 36. To that end, the bracket 172 may be mounted on the plate 110 in any suitable manner, as through the medium of cap screws 176. This relationship between the gasket 174 and the carrier rod 36 is significant in that it will assist or aid in maintaining the hermetically sealed relationship between the cover portion 24' and the peripheral flange 20 of the urn portion 10.

Figure 6:
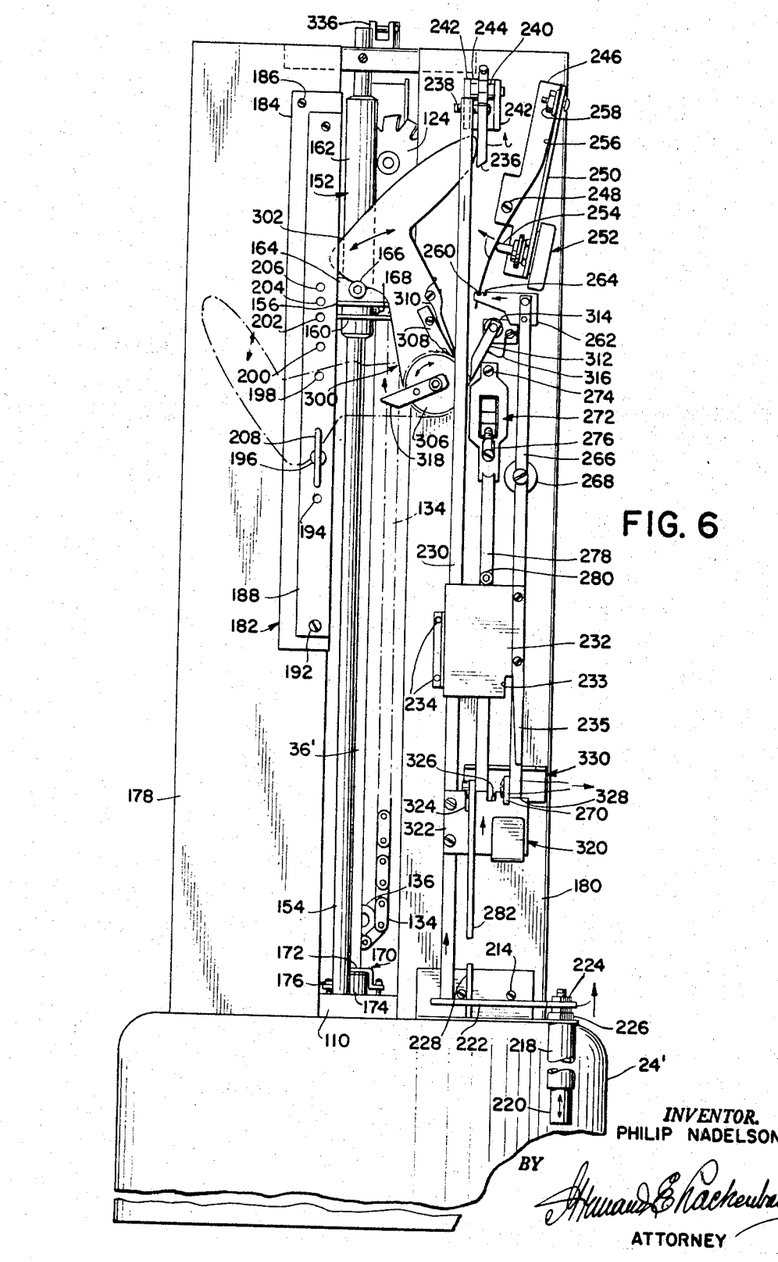
FIG. 6 is a front elevational view of the working head shown in FIG. 5, with certain parts having been removed to clearly illustrate the interior details of construction thereof.

The four standards 112 define an inner housing 116, as hereinbefore pointed out. A plurality of mounting panels 178 and 180 are fixedly positioned upon a respective one of the standards 112 located at what may be considered the front of the housing 116, these standards being shown at the left of FIG. 7, as viewed in that figure. With particular reference now to FIG. 6, it will be seen that a selector assembly generally designated by the reference character 182 is particularly adapted to be fixedly mounted or positioned upon the mounting plate 178. The selector assembly comprises a larger plate 184 fixedly positioned upon the plate 178 in any suitable manner, as by means of the fastening elements 186. The selector assembly 182 comprises, further, a smaller plate 188 that is particularly adapted to be fixedly positioned in forwardly disposed spaced parallel relationship with respect to the plate 184. This may be accomplished in any suitable manner, and, for example, a plurality of posts 190 (FIG. 7) fixedly positioned upon the plate 184 extends forwardly or outwardly therefrom, the plate 188 being fixedly connected to the posts in any suitable manner, as through the medium of suitable fastening elements 192. Each of the plates 184 and 188 comprises a suitable plurality of horizontally aligned apertures 194 through 206, each of which apertures corresponds with a particular predetermined or preselected number of operating cycles through which the container 42 is to be reciprocated. As will hereinafter more fully be described, the particular number of operating cycles chosen will depend upon the desired strength of the resulting beverage infusion, and the particular grind of coffee bean chosen to produce such an infusion. Suffice it to say at the present that the aperture 194 corresponds with three operating cycles, the aperture 196 with four operating cycles, the aperture 198 with six operating cycles, the aperture 200 with eight operating cycles, the aperture 202 with 12 operating cycles, the aperture 204 with 16 operating cycles, and the aperture 206 with 24 operating cycles. To effect the predetermining or preselecting of the number of operating cycles, the selector assembly 182 comprises, still further, a selector pin 208 which is particularly adapted to be disposed within a preselected one of a set of aligned apertures. It will at this point be understood that when the outer housing or cover 92 is positioned as illustrated in FIG. 5, the smaller and forwardly disposed plate 188 will be positioned flush against the inner side of the front cover portion 94, with the apertures visible through the selector slot 102. In addition, the selector pin 208 will extend through this slot, and be available for ready manipulation.

With continued reference now to FIGS. 5, 6 and 7, a plunger assembly 210 is fixedly mounted or positioned upon the plate 180. The plunger assembly comprises a mounting bracket 212 fixedly positioned upon the plate 180 in any suitable manner, as through the medium of suitable fastening elements 214. The bracket 212 comprises a horizontal portion 216 which is particularly adapted to rest upon the roof or ceiling portion 28' of the cover portion 24', and to extend outwardly therefrom. A plunger sleeve 218 extends downwardly from the horizontal portion 216, within which a plunger 220 is particularly adapted to be reciprocated. The plunger 220 is spring biased to the position illustrated in the drawings in any suitable manner, as through the medium of a spring (not shown) disposed within the sleeve 218 between the plunger and the portion 216 of the bracket 212. Upon the application of an upward force, hereinafter to be described, the plunger 220 will be reciprocated upwardly. The plunger is, as a result of this movement, particularly adapted to cause a similar movement of a link 222 of generally L-shaped configuration. The shorter leg of the link 222 is operatively associated with the upper end of the plunger 220 in any suitable manner, as through the medium of suitable fasteners 224. Spaces 226 are disposed between the link and the horizontal portion 216 to maintain a fixed spaced parallel relationship between the link and the bracket 212 when the plunger is biased to its normal position in which it extends outwardly and downwardly of the sleeve 218. The reciprocating movement of the link 220 is guided through the medium of a guide rod 228 that extends vertically through the longer leg thereof.

The link 220 is particularly adapted to cause the operation of a vertically reciprocating operating rod 230 that rests upon an end of the link and can be fixedly connected thereto. The rod 230 reciprocates within and is guided in its movement by a guide plate 232 that is fixedly positioned upon the mounting plate 180 in any suitable manner, as though the medium of suitable fasteners 234. At its upper end, the operating rod 230 is pivotally connected to a pivotable cam abutment 236 in any suitable manner, as through the medium of a pin 238. The abutment 236 is, in turn, non-rotatably mounted upon a rotatable shaft 240 that extends between and is rotatably associated with the legs 242 of a U-shaped bracket 244 that may be fixedly positioned upon the mounting plate 180 in any suitable manner. To facilitate an understanding of this invention, the rod 230 will hereinafter be referred to as a cam abutment operating rod.

A service switch mounting bracket 246 is fixedly positioned upon the mounting plate 180, as through the medium of the fasteners 248, which bracket is of L-shaped configuration having a leg 250 extending outwardly of the mounting plate 180. A normally closed service switch 252, which may be of any suitable and conventional construction, is fixedly positioned upon the leg 250 of the bracket 246, and comprises a movable contact 254 that is biased to a position in which the switch is closed. A flexible spring plate 256 is fixedly connected at one end thereof to the leg 250, as by means of the fastener 258, and along its length is particularly adapted to bear against the movable contact 254. The other end of the spring plate 256 is particularly adapted to be removably inserted within a slot 260 of a service switch spring plate mounting bracket 262. The service switch spring plate mounting bracket 262 comprises another slot 264, enabling the force with which the spring plate bears against the contact 254 to be adjusted. The bracket 262 is pivotally mounted or connected at the upper end of a service switch operating rod 266 that is pivotally mounted upon the mounting plate 180, as for example through the medium of a pivot pin 268.

The service switch operating rod 266 extends through the guide plate 232 and is to be guided thereby. A service switch operating rod control level 270 is pivotally mounted upon the operating rod 266 at the other end thereof, and is particularly adapted to be manually operable between a plurality of positions, hereinafter to be described.

An automatic operation switch 272 is fixedly positioned upon the mounting plate 180, as through the medium of suitable fasteners 274. The switch 272 may be of any suitable and conventional construction, and for example may comprise a simple two-position switch having a movable contact 276 that is particularly adapted to be moved between its two positions upon the application of some force thereto. In particular, an automatic switch operating rod 278 is reciprocally mounted within the guide plate 232, and is particularly adapted to be guided in its movements thereby. A limit pin or abutment 280 is fixedly positioned upon the rod, and is particularly adapted to perform the function of limiting the downward movement thereof. The upper end of this rod, when it is moved in an upward direction, is particularly adapted to contact the movable contact 276, and to move it to a position in which the switch is "on." An automatic switch operating rod control level 282 is pivotally connected to the rod 278 at the lower end thereof.

With particular reference again to FIG. 7, it will now be understood that the motor 122 and the switches 252 and 272 are particularly adapted to be disposed in a circuit that is so arranged as to cause the motor to operate when either one of the switches are in a position to close a circuit with respect thereto. Thus, the switches 252 and 272 will be disposed in parallel relationship with respect to one another, so that when either of the switches are in an "on" position, a circuit to the motor will be completed, and the motor will be rendered operative. To facilitate construction, repair, and the like, a bank of outlets is fixedly positioned upon the rear face of the mounting plate 180 from which suitable wiring (not shown) can extend for connection to a conventional room outlet. The motor 122 can be connected into one of the outlets by suitable wiring 286, the switch 252 connected to another of the outlets by suitable wiring 288, and the switch 272 connected to the last of the outlets in the bank 284 by suitable wiring 290. In each instance, this may be accomplished in any suitable manner, as through the medium of conventional 2-prong plugs 292.

A counter mechanism generally designated by the reference character 300 that is particularly adapted to cooperate with the selector assembly 182 is positioned upon the the mounting plate 180. The counter or counting mechanism comprises a counting cam 302 of irregular configuration that is biased in a counterclockwise direction through the medium of a coil spring 304. A counting ratchet wheel 306 is operatively associated with the counting cam 302, and is particularly adapted to rotate therewith in only one of a plurality of directions, namely, in a clockwise direction. To this end, a spring biased pawl 308 is rotatably mounted upon the counting cam 302, and is biased by means of a spring into engagement with the teeth of the ratchet 306. The teeth are so configured and arranged, as is the pawl 308, as to cause the ratchet to rotate with the counting cam when the latter is rotated in a clockwise direction through the medium of the cam lug 166. A counting pawl 312 is rotatably mounted upon a block 314 that is fixedly positioned upon the mounting plate 180. The pawl 312 is spring biased into engagement with the teeth of the ratchet 306 by means of a spring 316. This pawl, and teeth of the ratchet 306, are so configured and arranged as to enable the ratchet to rotate only in a clockwise direction, but to preclude rotation of the ratchet in a counter-clockwise direction. An operating link 318 is non-rotatably operatively associated with the ratchet 306, and is particularly adapted to perform the function of moving the contact 276 of the switch 272 to an "off" position. At this point, it will be remembered that the automatic switch operating link 318 and the ratchet wheel 306 are non-rotatably operatively associated with one another, and together are rotatable only in a clockwise direction. The counting cam 302, however, is rotatably operatively associated with the wheel 306 and the link 318, is rotatable in each of a plurality of directions, and when rotated in a clockwise direction, causes a similar rotational movement of the wheel and link because of the pawl 308. This structural relationship between these elements may be accomplished in any suitable manner, and for example may be accomplished by journaling the wheel and the link as one unit, and the cam as another unit, upon a shaft positioned upon and extending outwardly from the mounting plate 180. It will be understood that this shaft cannot clearly be illustrated in the drawings, because of the relationship between these parts, and is therefore not shown to preclude confusion in the drawings.

As is now considered readily apparent, the counter assembly 300 is so constructed and arranged as to enable a substantial selection of the number of reciprocating operating cycles through which the container 42 will be moved. Thus, the ratchet wheel 306 is provided with forty-eight teeth, and the apertures 194–206 are so positioned as to cause movement of the wheel in multiples of that number. To understand this fully, it must first be realized that the normal position of the cam 302 is when that element is in abutting engagement with the spring 256. In this position, the contact 254 causes the switch 252 to open the circuit to the motor 122. In addition, the switch 272 is in an "off" position, so that again the circuit to the motor is open. The motor is thus inoperative. In addition, this position of the cam 302 corresponds with a position of the link 318 in which it is disposed just below the contact 276 of the switch 272, so that if the switch is moved to an "on" position, there will be no interference from this link.

If we assume that the pin 208 is removed, and one of the switches 252 or 272 is caused to close a circuit to the motor, then the cam lug 166 will follow the follower assembly 152 as it, in turn, follows the container driving assembly 132 that causes the reciprocation of the container. The cam 302 being biased in a counter-clockwise direction by the spring 304, it will follow the lug 166 until it abuts against the pivot 268, which therefore also performs the function of an abutment or stop for the cam. As this counter-clockwise movement of the cam occurs, the pawl 308 moves along the teeth of the ratchet wheel 306 until a distance corresponding to twenty-four teeth has been traversed. When the follower assembly begins its upward movement, the lug 166 will again contact the cam and cause it to rotate in a clockwise direction. In this direction of movement of the cam, the wheel 306 and the link 318 will rotate with the cam because the pawl 308 is so configured and arranged, and is spring biased into a position in which it introduces a force in a clockwise direction against the teeth of the wheel. While the pawl 312 is so configured and arranged, and is spring biased into a position in which it precludes counter-clockwise rotation of the wheel 306, it does not preclude clockwise rotation thereof. Remembering now that, when the cam rotates in a counter-clockwise direction, it traverses a distance along the wheel 306 equal to twenty-four teeth, or half of its total periphery, the same distance will be traversed in a clockwise direction, and thus the counting pawl 312 will count off and traverse the twenty-four teeth caused to be moved therepast by the pawl 308, which now may be considered as a pawl to move or cause the rotational translatin of the wheel 306 in a clockwise direction. Accordingly, when the pin 208 is removed, the container 42 will traverse two complete operating cycles, upon the completion of which the link 318 will be translated to a position in which it is capable of moving the contact 276 of the switch 272 to an "off" position. The circuit to the motor 122 will thus be "opened," and the motor therefore will automatically shut off.

While the pivot 268 functions as an abutment for the cam 302 on the conditions of two operating cycles, the pin 208 will function as such an abutment for each selected number of operating cycles, corresponding with the various sets of apertures 194–206. Thus, if the pin were disposed in the set of apertures 194, as the lug 166 moves downwardly, the cam would abut the pin 208 after the pawl 308 had moved a distance corresponding to the traversal of sixteen teeth. As the lug moves upwardly, the pawl 308 would cause these sixteen teeth to move past the counting pawl 312. Thus, three complete operating cycles of the container would be necessary before the link 318 is again returned to a position in which it can move the contact 276 to an "off" position. The same analysis applies to the remainder of the sets of apertures 196–206, it now being realized that as the pin 208 is associated with a higher set of apertures, the pawl 308 traverses a lesser number of teeth on the wheel 306, and a greater number of operating cycles up to twenty-four is required before the link 318 is again rotatively translated to a position in which it can move the switch 272 to an "off" position.

There has just been described the manner in which the working head 90 functions automatically. Returning now to the plunger assembly 210, it will be realized that this automatic operation will be available when the working head is operatively positioned with respect to the urn portion 10. In such a position, the cover portion 24' will be positioned or disposed with respect to the peripheral flange 20 as is the cover portion 24 illustrated in FIG. 1. However, when the cover portion 24' is so positioned, the upper edge of the peripheral flange 20 causes the plunger 220 to be moved vertically upwardly. Through the medium of the link 220, the rod 230 will be caused to move upwardly, as a result of which movement the abutment 236 will be caused to pivot in a clockwise direction as illustrated in FIG. 7. The abutment thus will be moved out of the path of movement of the cam 302, so that automatic operation of the working head can be effectuated. The upward movement of the rod 230 carries with it a selector plate assembly generally designated by the reference character 320. This assembly comprises a selector plate 322 having a plurality of notches 324, 326 and 328. When the plunger assembly 210, and particularly the plunger 220 is in its normally disposed downward position, the abutment 236 is disposed in a position substantially adjacent or against the plate 180, thus precluding counter-clockwise movement of the cam 302, the plate 322 is in a downward position, and thus so too is the automatic switch operating lever 282. This position of the operating lever 282 is clearly illustrated in FIGS. 5 and 7, and it will now be realized that this position of the lever corresponds to an inoperative position thereof in which it is partially disposed within the slot 104 in the front cover portion 94. This is to indicate that the working head 90 is not in an automatic operation position. Thus, even if the lever 282 is grasped, pivoted outwardly of the housing 92, and then moved upwardly, the length of the rod 278 is chosen so that maximum upward movement thereof will not move the contact 276 to turn the switch 272 to an "on" position. However, when the working head 90 is operatively associated with the urn portion 10, the rod 230 is moved upwardly, as aforesaid, and the couch 324 of the plate 322 cams the lever 282 to the dotted line position of FIGS. 5 and 7. In this automatic operating position, the rod 278 is also moved upwardly, so that subsequent grasping of the lever 282, and lifting it vertically upwardly, will cause engagement between the upper end of this rod and the contact 276, thus enabling the switch 272 to be moved to an "on" position.

Similarly, when the working head 90 is operatively associated with the urn portion 10, the plate 322 cams the service switch operating lever 270 to the dotted line position illustrated in FIGS. 5 and 7, in which position it is partially disposed within a narrow portion 107 of the slot 106 in the front cover portion 94. In this position, the lever 270 extends partially into the housing 92, and is thus inoperative to cause manual operation of the working head. Even if the lever 270 is grasped, and an attempt is made to move the lever, downward movement is precluded by the notch 328 of the plate 322. Lateral or pivotal movement of the lever is precluded, since it is disposed, in this inoperative position, within a notch 233 of the guide plate 232. A finger plate 235 is fixedly positioned upon the guide plate 232, and extends downwardly therefrom, to insure that lateral or pivotal movement of the lever 270 will be precluded. This is important when it is realized that, when the lever 270 is pivoted in a counter-clockwise direction, the spring 256 is caused to move away from the contact 254 and the normally biased closed switch 252 will then close a circuit to the motor 122. When the working head 90 is not in operative association with the urn portion 10, and the plunger assembly 210 is normally biased to the position illustrated in the drawings, the plate 322 is allowed to move downwardly, thus enabling the lever 270 to extend outwardly of the housing 92. In this position of the plate 322, the operator can elect between positioning the lever 270 within the notch 326, or within and along the notch 328. When the lever is located in the former notch, the rod 266 is caused to pivot in a clockwise direction, thus moving the spring 256 into firm engagement with the contact 254, insuring that the switch 252 will be in an open position. The circuit to the motor will thus be open, and it will remain inoperative. However, when the lever 270 is disposed within the notch 328, it can be moved laterally towards the right, as viewed in FIG. 6, causing pivotal movement of the rod 266 in a counter-clockwise direction, thus enabling the switch 252 to close the circuit to the motor 122. If the lever 270 is laterally moved towards the left, as viewed in that figure, to the end of the notch 328, the spring will be disposed in engagement with the contact 254 and the force applied thereto will be just sufficient to open the circuit to the motor. At this point, it is to be remembered that the force the spring 256 is capable of applying to the movable contact 254 is capable of adjustment as through the medium of the slots 260 and 264.

The selector plate assembly 320 comprises a guide plate 330 fixedly positioned upon the mounting plate 180. The plate 330 comprises a rod guide plate 332 extending outwardly from the plate 180, and being particularly adapted to just slightly engage the rods 266 and 278. In their vertical movement, therefore, these rods will reciprocate between this plate 332, and the plate 322, so that their movement will be substantially perfectly vertically linear. To insure similar movement of the plate 322, the plate 330 comprises a selector plate guide 334 which extends outwardly of the plate 180, and upwardly of and in front of the plate 322. In conjunction with the guide plate 232, it will now be seen that the operation of the working head will be facilitated, in that wasted movements in other than the desired and intended direction will be substantially precluded.

The operation of an apparatus for producing a beverage infusion constructed in accordance with the principles of the present invention, and particularly an apparatus that is so constructed and arranged as to be automatically operable, will now be understood in view of the foregoing discussion. An embodiment particularly adapted for use in the home has hereinbefore been described. For commercial or industrial use, a working head 90 has been described that enables the desired beverage infusion to be produced automatically with the expenditure of a minimum amount of time, effort, and attendance. The automatic operation is effectuated when the working head is operatively associated with the urn portion. Servicing of the working head is facilitated, in that, by simply lifting it from its position of cooperation with the working head, the operating lever 270 will be exposed for manual operation. The position of the container 42 with respect to the cover portion 24' can thus be determined with extreme facility by a simple manual operation of this lever. It can therefore be lowered to a position in which it extends below the cover portion 24' for removal of the coffee bean, cleansing, and the like. In addition, the working head, once it has automatically cooperated with the urn portion 10 to produce the desired coffee or beverage infusion, can be translated to another urn portion, to produce a further quantity of the desired beverage. This may be accomplished in any suitable manner, as for example through the medium of a suitable but yet simple crane assembly that can cooperate with a lifting lug 336 fixedly positioned upon the plate 114 particularly for that purpose. In this manner, it has been found that one working head can service a minimum of ten urns per hour, thus being capable of producing thirty gallons of the desired beverage infusion in three gallon batches. In this connection, it will be realized that the speed of an operating cycle of the container 42 can be varied, since it is produced through the speed of the motor 122 and the transmission or reduction gear assembly 124. Inasmuch as these elements are removable as a unit from the inner housing 116, the size of these elements may easily and quickly be changed.

In view of the foregoing, it will now be seen that each and every one of the objects and advantages of an apparatus for producing a beverage infusion can be achieved when such an apparatus is constructed in accordance with the principles thereof. Whether the apparatus is manually or automatically operable, the most desirable elements of the coffee bean are captured. This is true for each and every one of the reasons hereinbefore set forth, among which is the fact that the urn portion 10 is so constructed and arranged as to present a minimum by-pass between it and the container 42, while yet providing some differential of dimension to accommodate imperfectness in the cylindrical configuration of the urn portion. This is particularly true when it is fabricated of such materials as glass, or the like. While a minimum by-pass is provided in the reservoir portion 12 of the urn 10, a rapid by-pass is provided at the flared portion. This precludes the liquid in the reservoir from being forced upwardly too far when the container rises. Thus, the dimensions of the flared portion are chosen so as to keep the cover portion 24 or 24' clear of the contents of the reservoir portion. The displacement of the liquid therein, or the infusion, by the container and the coffe bean disposed therewithin, plus any additional area for the turbulence that occurs during the actual infusion step, is therefore provided for by the angle of inclination and the length or height of the flared portion.

The hermetically sealed relationship between the cover portion 24 or 24' and the peripheral flange 20 insures that the most desirable elements of the coffee bean will be captured. This is true notwithstanding the provision of the pouring spout 25, which is positioned well above the seat or juncture 22, to thus maintain this hermetic relationship. Nor is this relationship disturbed at the location where the carrier rod 36 or 36' enters the cover portion, in view of the fact that the gasket or sealing element at that location is flexible and can be compressed.

In the automatic embodiment, it will be understood that the unit is not assembled until the water or liquid base has first reached its brewing temperature, and is then poured into the reservoir portion 12 of the urn 10. While the water or liquid base is entering the liquid reservoir, the coffee bean is disposed within the container, and the latter then drawn or lifted to its highest position in the cover portion 24', as through the medium of the manual operating lever 270. At the proper time, the cover portion 24' is then inserted into the urn portion 10, at the flange 20, enabling the container then to proceed through its operating cycles. For each operating cycle of the container, there is an immersion period, during which time the container is disposed within the liquid base in the reservoir portion 12, and a drain-off period, during which time the container is located or disposed within the cover portion 24 or 24'. As hereinbefore pointed out, this insures that the coffee bean contained within the container will be completely wet-through. The unit is maintained in its hermetically sealed relationship for a final drain-off period after the last cycle of operation is completed. Only then is this air-tight or hermetic relationship disrupted. The working head 90 can then be translated to another urn portion 10, subsequent, of course, to the container being cleansed and supplied with a fresh quantity of coffee beans.

It will now be understood that numerous modifications fall within the scope of the present invention. Thus, the driving assembly 132 may comprise, instead of the endless belt 134, a simple rod having a coil spring disposed thereabout. By providing the follower assembly 152 with an element disposed within the coils of such a spring, and by causing the rod and thus the spring to rotate, the follower assembly will be caused to reciprocate. Another alternative is to substitute a rod having criss-cross threading for the endless belt 134, and again providing the follower assembly with an element to move along the threads. Cross-over grooves at the upper and lower ends of such a rod would enable the follower assembly to reciprocate both vertically upwardly and downwardly. Other modifications are also within the scope of this invention. Thus, while the container has hereinbefore been described, disclosed, shown and illustrated as comprising three basic component parts, an alternative construction would provide for a container comprising simply a top portion, and a side portion having a bottom. These two components could be removably associated with one another in any suitable manner, and for example the use of a construction similar to that illustrated in FIGS. 2 through 5 can be invoked.

tion similar to that illustrated in FIGS. 2 through 5 can an apparatus for producing an infusion of coffee. It will, however, be understood that an infusion of other beverages can be produced by an apparatus constructed in accordance with the principles of the present invention. Whenever the matter from which the infusion is derived has a tendency to swell, as does a coffee bean, then it will be understood that the dimensions of the container 42 must be chosen so that the volume presented thereby is greater than the maximum volume to be occupied by the matter, and the additional volume occupied as a result of its swelling. For example, in the instance of producing an infusion of coffee the dimensions of the container are chosen so that the volume presented thereby is approximately one-and-one-half times the volume to be occupied by the coffee bean when swollen.

After reading the aforegoing detailed description of an exemplary and illustrated form of the present invention, it will be understood that the objects set forth at the outset of this specification have successfully been achieved. However, while the invention has been shown, illustrated, described and disclosed in terms of an illustrated embodiment or modification which it has assumed in practice, the scope of the invention should not be deemed to be limited thereby, such other embodiments or modifications intended to be reserved especially if they fall within the scope of the claims here appended.

What is claimed is:

1. Apparatus for producing a beverage infusion comprising an urned portion having, in turn, a liquid reservoir, a flared portion extending upwardly and outwardly from said liquid reservoir, a peripheral flange extending upwardly from said flared portion and a seat at the juncture between said flared portion and said peripheral flange; a pouring spout being located along said peripheral flange and above the seat defined by the juncture between the flange and the flared portion; the angle of inclination and length of said flared portion being chosen to provide a rapid by-pass between the container and the flared portion upon the upward stroke of said container; the area of the by-pass about the container at the location of said flared portion being sufficient to enable the liquid caused to flow upwardly by the container on its upward stroke to enter the by-pass and return to the liquid reservoir without entering the cover portion, enabling the cover portion to remain clean and free of liquid in the reservoir; said liquid reservoir further comprising a cover portion disposed in an hermetically sealed relationship with respect to said urned portion, said cover portion being particularly adapted to be disposed in an hermetically sealed relationship with respect to said peripheral flange, and upon said seat; and a container particularly adapted to be reciprocated through at least one cycle relative to a liquid base disposed in said liquid reservoir; the dimensions of said container and said liquid reservoir being chosen to define a minimum by-pass therebetween; and wherein said container comprises a top portion; a bottom portion; and a center portion extending between said top and bottom portions; and wherein said top and bottom portions each comprise at least one mesh insert, the insert in said top portion being recessed, and the insert in said bottom portion protruding therefrom.

2. Apparatus as defined in claim 1, wherein:
said top and bottom portions each comprise:
a finger extending therefrom into said container;
said fingers each having:
a leg extending therefrom; and wherein:
said center portion comprises:
a prong extending therefrom towards the center of said container;
the number of prongs corresponding with the number of fingers extending from said top or bottom portions;
the length of said fingers being chosen so as to dispose the leg of the fingers extending from said top portion below a corresponding one of the prongs, and the leg of the fingers extending from the bottom portion above a corresponding one of the prongs, when said legs are disposed in parallel relationship with respect to one another.

3. Apparatus as defined in claim 2, wherein:
a carrier rod extends upwardly from said container, and is removably operatively associated therewith:
said carrier rod extends outwardly from said cover portion, and comprises:
a handle enabling an operator to effectuate at least one cycle of operation comprising an immersion and a drain-off period of said container relative to the liquid in said liquid reservoir.

4. Apparatus for producing a beverage infusion comprising an urned portion having a liquid reservoir; an automatic working head particularly adapted to be disposed in an hermetically sealed relationship with respect to said urn, and comprising a container driving assembly; means for effectuating the operation of said container driving assembly; a selector assembly for pre-selecting the number of cycles of operation each comprising an emersion and drain-off period of said container; a counter assembly for automatically effectuating the desired pre-selected number of operating cycles; said counter assembly being inherently movable to one of a plurality of positions, the limit of movement of said counter assembly to this position being defined by said selector assembly, and being movable to another of said plurality of positions by said container driving assembly; and a cycle selection lever assembly causing the operation of said means for operating said container driving assembly, said lever assembly comprising a switch assembly for completing a circuit to said means for operating said container driving assembly; and wherein said urned portion further comprises a container particularly adapted to be automatically reciprocated through at least one cycle comprising an emersion period and a drain-off period relative to a liquid base disposed in said liquid reservoir by said working head.

5. Apparatus as defined in claim 4, wherein:
said cycle selection lever assembly is movable between a plurality of positions;
said lever assembly, when disposed in one of said positins, being rendered inoperative to cause the operation of said switch assembly; and wherein:
said working head further comprises:
a plunger assembly responsive to positioning said working head in operative association with said urn portion for moving said cycle selection lever assembly to another of said plurality of positions in which said lever assembly is rendered operative to cause the operation of said switch assembly.

6. Apparatus as defined in claim 5, wherein:
said working head further comprises:
a service lever assembly for causing the operation of said means for operating said container driving assembly, and comprising:
a service lever switch assembly disposed in parallel relationship with respect to the switch of said cycle selection lever assembly for completing a circuit to the means for operating said container driving assembly;
said service lever assembly and said switch assembly being constructed and arranged so as to be capable of closing and opening the circuit to the means for operating the container driving assembly as desired, enabling the container to be disposed in any position relative to the working head, further enabling the container and the working head to be serviced, the supply of material from which the infusion is to be derived replenished, and the like.

7. Apparatus as defined in claim 6, wherein:
said service lever switch assembly is normally biased to a position in which the circuit to said means is closed; wherein:
said service lever assembly comprises a spring for biasing said switch to a position in which the circuit to said means is open; and wherein:
said service lever, when disposed in one of a plurality of positions, enables said spring to apply a force to said switch assembly sufficient to open the circuit to said means;
said service lever, when disposed in another of said plurality of positions, being pivotally movable to vary the force of said spring applied to said switch assembly between a value sufficient to open the circuit to said means, and a value at which the force of the spring is overcome by said switch assembly, and the circuit to said means is closed.

8. Apparatus as defined in claim 7, wherein:
a lever assembly selector plate is operatively associated with said plunger assembly, and is responsive to the movement thereof;
said selector plate having a first notch enabling said cycle selection lever assembly to be rendered inoperative, and for causing said cycle selection lever assembly to be moved to an operative position when said plunger assembly is disposed in operative position with respect to said urn portion;
said selector plate having a second and third notch in which said service lever assembly is capable of being selectively disposed when said working head is disassociated with respect to said urn portion, said second notch corresponding to a position in which said spring is sufficient to open the circuit to said means for operating said container driving assembly, and said third notch corresponding to the other position of said service lever in which it is pivotally movable;
said selector plate, in response to the movement of said plunger assembly when said working head is operatively associated with said urn portion, moving said service lever assembly to an inoperative position.

9. Apparatus as defined in claim 8, wherein:
said plunger assembly comprises:
a movable abutment for rendering said counter assembly inoperative when said working head is disassociated relative to said urn portion;
said abutment being moved to render said counter assembly operative in response to the movement of said plunger assembly when said working head is operatively associated with said urn portion.

10. Apparatus as defined in claim 9, wherein said counter assembly comprises:

a counting cam biased to move in one direction to the one of said plurality of positions;

said counting cam being movable to the other of said plurality of positions by said container driving assembly;

said counting cam, in the other position, being disposed at the limit of its movement in the direction of movement corresponding thereto, and being disposed in engagement with the spring of said service lever assembly, for causing said spring to apply a force to said service lever switch assembly, and opening the circuit to said means operating said container driving assembly, enabling said container to constantly and accurately be disposed in a position corresponding to the beginning of an operating cycle within the cover portion of said working head;

said counting cam and said spring being inoperative to effect opening the circuit to said means when said cycle selection lever assembly is in an operative position, and the switch of said cycle selection lever assembly is in a position in which the circuit to said means is closed.

11. Apparatus as defined in claim 10, wherein:

said counter assembly further comprises:

a link for causing the switch of said cycle selection lever assembly to be moved to a position opening the circuit to said means in response to and upon completion of the movement of said counter assembly through the desired pre-selected number of cycles of operation.

12. Apparatus as defined in claim 11, wherein:

the means for causing the operation of said container driving assembly is so constructed and arranged as to present an assemblage of elements that can be disassociated from said working head substantially as a unit to facilitate cleaning, repairing, replacement and the like.

References Cited

UNITED STATES PATENTS

| | | | |
|---|---|---|---|
| 1,053,735 | 2/1913 | Lefevre | 99—297 |
| 1,506,712 | 8/1924 | McAllen | 99—289 X |
| 1,552,565 | 9/1925 | Morton et al. | 99—297 |
| 1,699,303 | 1/1929 | Mennicke et al. | 99—297 |
| 3,020,823 | 2/1962 | Musso | 99—297 X |

FOREIGN PATENTS

| | | |
|---|---|---|
| 1,249,992 | 11/1960 | France. |
| 538,794 | 9/1932 | Germany. |
| 501,710 | 11/1954 | Italy. |

WILLIAM I. PRICE, *Primary Examiner.*